United States Patent [19]
Chen et al.

[11] Patent Number: 6,124,002
[45] Date of Patent: Sep. 26, 2000

[54] DESIGN FOR MANUFACTURING MAGNETIC RECORDING MEDIUM

[75] Inventors: Li-Kou Chen, Taipei; Wu-Geng Peng, Taoyuan, both of Taiwan

[73] Assignee: Industrial Technology Research Institute, Hsinchu, Taiwan

[21] Appl. No.: 08/227,633

[22] Filed: Apr. 14, 1994

[51] Int. Cl.[7] ..................................................... H01F 1/00
[52] U.S. Cl. ........................... 427/549; 427/128; 427/599
[58] Field of Search ..................................... 427/127–132, 427/599, 549

[56] References Cited

U.S. PATENT DOCUMENTS

| | | | |
|---|---|---|---|
| 3,413,141 | 11/1968 | Friedman ................................. | 427/599 |
| 3,681,138 | 8/1972 | Ankenbrand et al. ................... | 427/599 |
| 4,271,782 | 6/1981 | Bate et al. ............................... | 118/623 |
| 4,336,278 | 6/1982 | Pertzsch ................................ | 427/599 X |
| 4,518,626 | 5/1985 | Kato et al. .............................. | 427/48 |
| 4,672,913 | 6/1987 | Kato et al. .............................. | 118/623 |

FOREIGN PATENT DOCUMENTS

| | | |
|---|---|---|
| 61-160835 | 7/1986 | Japan . |
| 405228428A | 9/1993 | Japan . |

*Primary Examiner*—Bernard Pianalto
*Attorney, Agent, or Firm*—W. Wayne Liauh

[57] ABSTRACT

A method to manufacture magnetic recording medium including the step of subjecting the unfinished magnetic recording medium to a random orientation device prior to a drying step, to thereby remove the magnetic anisotropy of the magnetic recording medium caused by the preferential orientation of ferromagnetic fine particles along the travelling direction of the unfinished magnetic recording during the application of a magnetic coating composition onto a non-magnetic support strip. The random orientation device includes a magnet, which is oriented parallel to the plane of the non-magnetic strip and generates a set of lines of magnetic field. Each set of lines of magnetic fields are associated with only one magnet and contain both forward and backward directional magnetic fields in a direction perpendicular to the travelling direction of the unfinished magnetic recording medium. More than one magnet can be used; however, each magnet generates a separate and independent set of such lines of magnetic field.

16 Claims, 11 Drawing Sheets

DESIGN FOR MANUFACTURING MAGNETIC RECORDING MEDIUM

FIELD OF THE INVENTION

The present invention relates to a process for preparing a magnetic recording medium containing randomly oriented ferromagnetic fine particles. More particularly, the present invention relates to a process by which one or more magnets are utilized to effectuate random orientations of the ferromagnetic fine particles contained in a magnetic recording medium to minimize the effect of modulation. The magnetic recording medium can be in the form of a disc or a sheet, and is formed by applying a coating of a magnetic recording layer on a non-magnetic support in the strip form.

BACKGROUND OF THE INVENTION

Magnetic recording media are typically prepared by coating a magnetic recording composition on a non-magnetic support. The magnetic recording composition contains ferromagnetic fine particles, such as Co—$\gamma$—$Fe_2O_3$, Co—$\gamma$—$Fe_3O_4$, $\gamma$—$Fe_2O_3$, $\gamma$—$Fe_2O_3$, or $CrO_2$, uniformly dispersed in a binder-solvent. The non-magnetic support, which typically comprises polyethylene terephthalate, cellulose triacetate, cellulose diacetate, polyvinylidene chloride, or polypropylene, is in the form of a strip which is continuously travelling in a pre-determined direction. Conventional coating methods, such as doctor coating method, bottom-reverse coating method, or gravure coating method, can be utilized in forming the magnetic coating layer.

Some ferromagnetic fine particles, particularly the Co-doped $\gamma$—$Fe_2O_3$ (i.e., Co—$\gamma$—$Fe_2O_3$), exhibit geometric anisotropy, and they tend to be arranged in a particular direction, typically the coating direction, or the travelling direction of the undried magnetic recording medium, during the manufacturing process, thus causing anisotropy in the final magnetic recording medium product. When a magnetic recording medium, in which such anisotropy is present, is used as a magnetic disc, the output level of the reproduced signal in the coating direction is stronger than those in other directions. As a result, the output signal level reproduced by a rotating magnetic disc having such anisotropy becomes position-dependent, i.e., the output signal depends on the position of the magnetic disc where the signal is recorded. This phenomenon is commonly referred to as "modulation", which is an undesirable property of a magnetic recording medium, particularly of flexible magnetic discs (i.e., floppy discs).

To remove this anisotropy, the ferromagnetic fine particles in a magnetic recording medium are often subject to a random orientation process so that the squareness ratio (residual flux density/maximum flux density) is the same or essentially the same when measured from every point in a circle. Typically two approaches can be applied to achieve the random orientation of the ferromagnetic fine particles: using electromagnetic field and using magnet(s). Random orientation processes utilizing electromagnetic field have the advantages that: (1) they cause uniform de-magnetization, and (2) they achieve relatively better random orientation results. However, the electromagnetic field processes are found to the have the following disadvantages: (1) they consume large electricity energy; (2) they require large amounts of cooling water, which generates liquid wastes and could cause pollution concern; and (3) they require bulky equipment which occupies large space. The processes using magnets, on the other hand, does not consume electric energy nor does it require cooling water. Thus they are environmentally more correct processes. Furthermore, the magnets are usually much smaller in volume than an electromagnetic field device. Therefore, it appears preferably to develop magnets-based process to effectuate the random orientation of the ferromagnetic fine particles to eliminate or minimize the effect of modulation.

Japanese patent application Nos. 78/104,205 and 79/149,607 disclosed the process of subjecting the magnetic coating layer to one direction in a first magnetic field for first orientation, and in a second magnetic field having reversed direction for second orientation to elimination preferential orientation of the ferromagnetic fine particles. The second magnetic field is weaker than the first magnetic field and is in a reversed direction of the first magnetic field. U.S. Pat. No. 4,518,626 disclosed an improved method over that provided in either disclosure by subjecting the magnetic coating layer to a random orientation means, which comprises at least five magnets whose lines of magnetic field connecting two adjacent magnets. Other disclosures providing methods to provide random orientation of the ferromagnetic fine particles can be found in Japanese patent application Nos. JP1-251,319, JP1-169,725, and JP61-160835. All of these methods involve subjecting the magnetic coating layer to lines of magnetic field associated with at least two magnets. It is thus desirable to develop a method that would require only one magnet, or require a random orientation means which involves lines of magnetic field that are associated with only one magnet, to provide at least 98% random orientation.

SUMMARY OF THE INVENTION

The primary object of the present invention is to provide a method to effectuate random orientation of ferromagnetic fine particles in a magnetic recording medium utilizing a random orientation means, which comprises lines of magnetic field that are associated with only one magnet. However, the present invention also allows a flexibility that two or more magnets can be used which are independent of each other.

More particularly, the primary object of the present invention is to provide a method to remove the modulation of a magnetic recording medium caused by the preferential orientation of the ferromagnetic fine particles along the travelling direction of the non-magnetic support, upon which a magnetic coating layer is applied, during the manufacturing of the magnetic recording medium. The method disclosed in the present invention comprises a random orientation means which causes a 180° reversal of the y-component of the magnetic field, wherein y is the direction perpendicular to the travelling direction. The travelling direction of the support strip is designated as the x-direction. The random orientation means disclosed in the present invention can be provided by a only single magnet. However, more than one of such random orientation means can be provided in the process, each of the random orientation means works independently of each other.

The present invention distinguishes from prior art methods mainly in that the random orientation means of the present invention comprises lines of magnetic field that associated with only one magnet. In the prior art methods, the lines of magnetic field are associated with at least two magnets. Furthermore, in the present invention, the magnet is disposed in such a manner that it is parallel to the plane of the magnetic recording medium (i.e., the principal axis of the magnet, S→N, is parallel to the plane containing the magnetic recording medium). This means that the magnet is oriented in such a manner that the extended line connecting S→N in the magnet does not intersect the plane containing the magnetic recording medium during the random orienting process of the ferromagnetic fine particles. On comparison, in the prior art methods, the magnet is pointing towards the magnetic recording medium. The random orientation means of the present invention is capable of providing lines of magnetic field which reverse the y-direction of the magnetic force applied to the ferromagnetic fine particles with only one magnet, when the magnetic recording medium travels past the magnet.

In a preferred embodiment of the present invention, the magnet (i.e., S→N ) is disposed parallel to the direction at which the magnetic recording medium travels. The magnet can be placed above or beneath the magnetic recording medium. In another preferred embodiment, the magnet is horizontally rotated about 60 degrees from the parallel position of the first preferred embodiment. (therefore, the magnet is at a 60° angle from the travelling direction of the magnetic recording medium). In the second preferred embodiment, the magnet is no longer parallel to the travelling direction of the magnetic recording medium, however, since the magnet is rotated only horizontally, it is still parallel to a plane containing the magnetic recording medium.

Although the method disclosed in the present invention can be achieved with only one magnet, a plurality of magnets can be utilized to provide flexibility. If more than one magnet is used in the process, each magnet provides a separate and independent random orientation means. In yet another preferred embodiment of the present invention, two magnets are used, one magnet is at 60° from the travelling direction, and the second magnet is at 120° from the travelling direction. The two magnets are at 60° of each other, in a head-to-head fashion, i.e., the N-poles (or S-poles) of the two magnets are facing each other. In yet another preferred embodiment of the present invention, also two magnets are used. Both magnets are parallel to the travelling direction of the unfinished magnetic recording medium and are disposed in a head-to-head fashion. In these two embodiments, although two magnets are used, since they are placed in a head-to-head manner, the lines of magnetic field are respectively associated with only one magnet, and each magnet provides a separate and independent random orientation means.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention relates to a process for preparing a magnetic recording medium, which comprises a non-magnetic strip support having coated thereon a magnetic coating layer containing randomly oriented ferromagnetic fine particles, to eliminate the effect of modulation. The process comprises the step of continuously travelling an unfinished magnetic recording medium, which contains the non-magnetic strip support having coated thereon an undried magnetic coating containing ferromagnetic fine particles, through a random orientation means to effectuate random orientation of the ferromagnetic fine particles. The random orientation means comprises lines of magnetic field associated with a single magnet whose y-directional component (y-direction being perpendicular to the travelling direction of the non-magnetic strip) exhibits a 180-degree reversal in the treatment zone, which is defined as the region in which the magnetic coating is subject to the influence of the magnetic field emanated from the magnet, and both the forward and the reverse y-directional components are of substantially equal magnitude, to thereby overcome the undesired preferential orientation of the ferromagnetic fine particles along the travelling direction (i.e., the x-direction).

Figure 1:
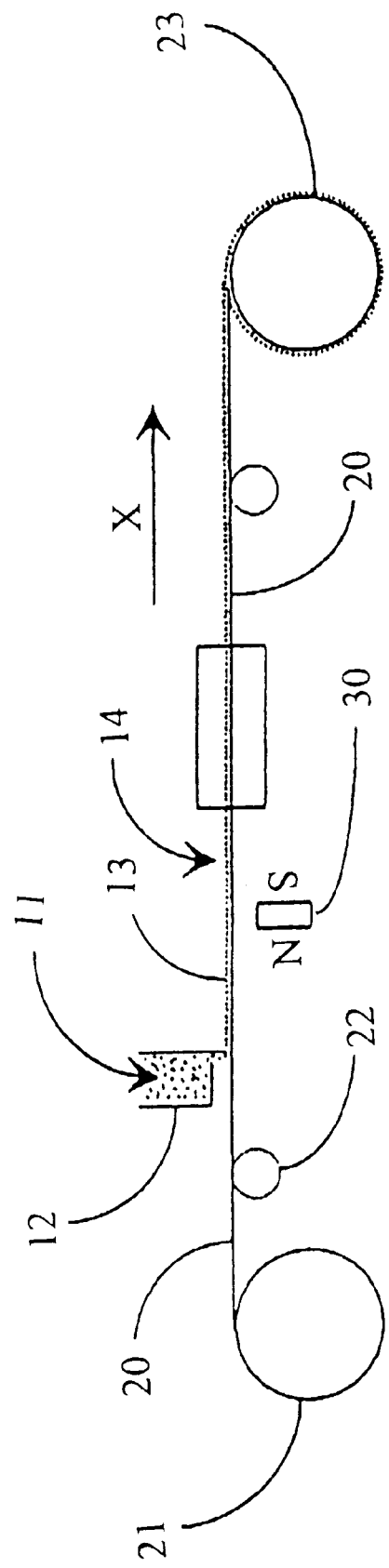
FIG. 1 is a schematic diagram showing the process disclosed in the present invention

Now referring to the drawings. FIG. 1 is a schematic diagram showing the process disclosed in the present invention. A magnetic coating composition 11 contained in a container 12 is applied on a non-magnetic strip support 20, which is caused to be continuously travelling in the direction shown as (x) from a supply roll 21 through a pair of guide rollers 22, to a take-up roll 23. The magnetic coating composition 11 forms a magnetic coating layer 13 on the surface of the non-magnetic strip support 20. Any conventional coating method, such as doctor coating method, bottom-reverse coating method, or gravure coating method, can be utilized in forming the magnetic coating layer. The unfinished magnetic recording medium 14, which contains the non-magnetic strip support 20 with the magnetic layer 13 coated thereon, is shown to travel through a random orientation means 30, which causes a random orientation of the magnetic fine particles, not shown, contained in the magnetic coating composition 13. After the random orientation means 30, the non-magnetic strip support 20 containing the magnetic coating composition 13, both of which collectively form an unfinished magnetic recording medium 14, travels through an oven 40, for form a magnetic recording medium.

Figure 2A:
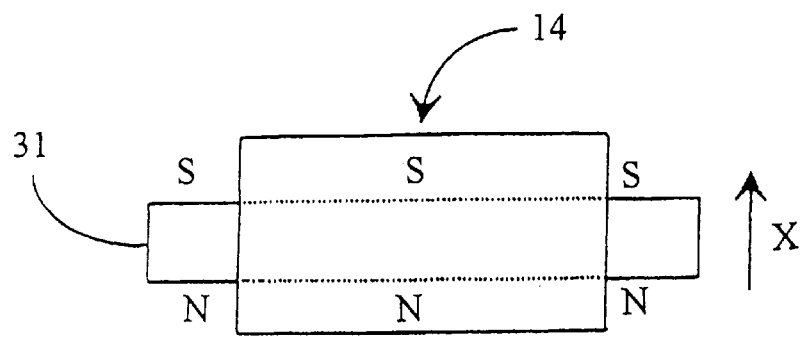
FIGS. 2a, 2b and 2c are a top view, front view, and side view, respectively, of the random orientation means according to the first preferred embodiment of the present invention, shown with a portion of the unfinished magnetic recording medium travelling on top thereof
Figure 2B:
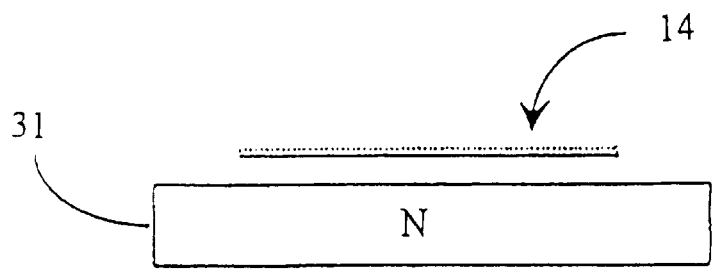
Figure 2C:
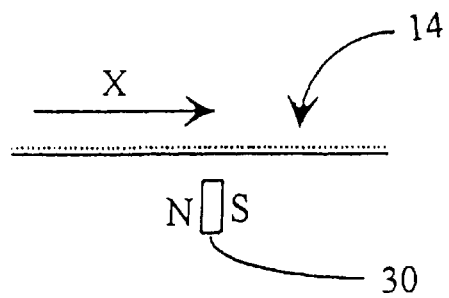

FIG. 2a is a top view of the random orientation means 30 according to the first preferred embodiment of the present invention, shown with a portion of the unfinished magnetic recording medium 14 travelling on top thereof. The random orientation means 30 consists of a single magnet 31 placed below the unfinished magnetic recording medium 14 and is parallel to the travelling direction thereof (x). FIGS. 2b and 2c are the front view and side view, respectively, of the random orientation means 30 according to the first preferred embodiment of the present invention. It is to be noted that, if necessary and/or desired, the random orientation means 30 can be placed on top of the unfinished magnetic recording medium 14, instead of below it.

Figure 3:
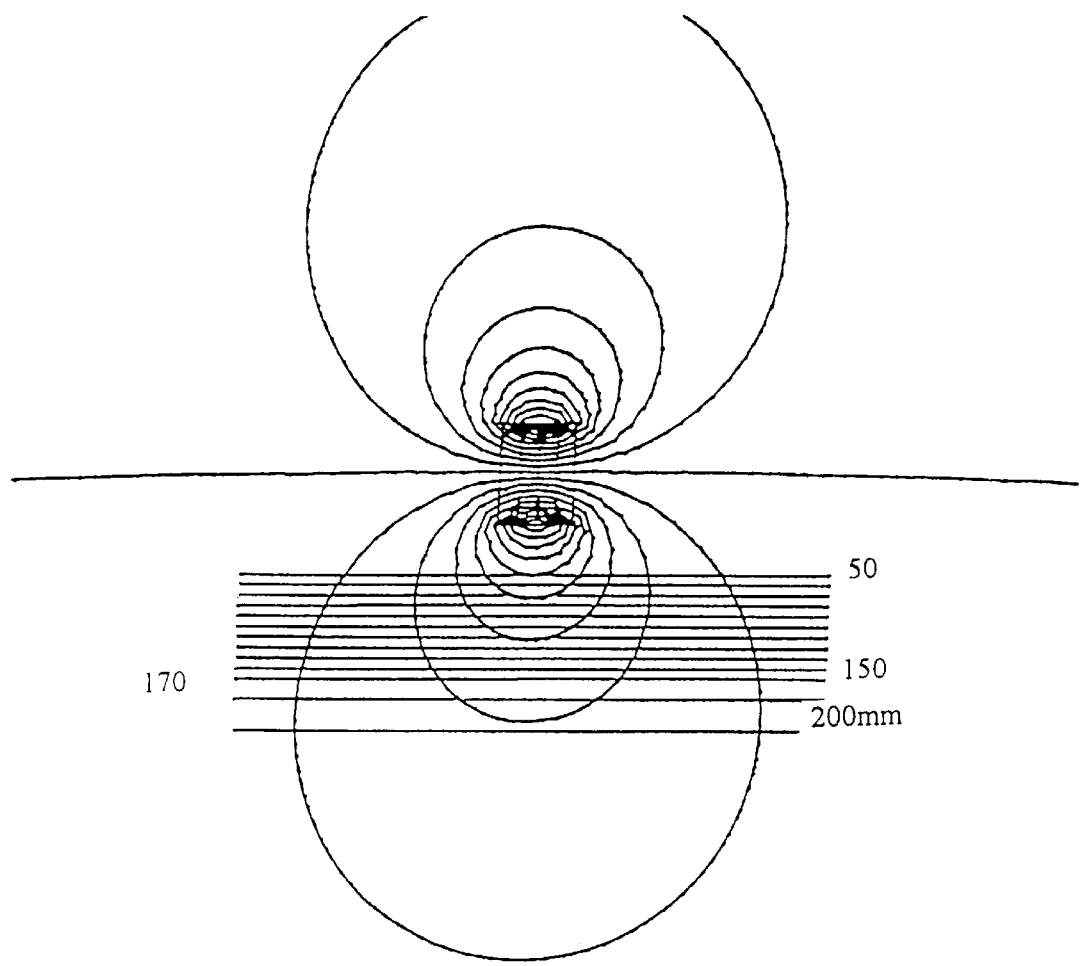
FIG. 3 illustrates the lines of magnetic field of the random orientation means in various spatial relationship with the travelling direction of the unfinished magnetic recording medium in accordance with the first embodiment of the present invention.

FIG. 3 illustrates the lines of magnetic field of the random orientation means in various spatial relationship with the travelling direction of the unfinished magnetic recording medium in accordance with the first embodiment of the present invention. The random orientation means 30 consists of a single magnet 31 which is placed at distances between 50 mm to 200 mm below the unfinished magnetic recording medium. In the present invention, the magnet is disposed in such a manner that it is parallel to the plane of the magnetic recording medium, i.e., the principal axis of the magnet, S→N, is parallel to the plane containing the magnetic recording medium. Being parallel to the plane of the magnetic recording medium means that the magnet is oriented in such a manner that the extended line connecting S→N of the magnet does not intersect the plane containing the magnetic recording medium during the random orientation treatment. On comparison, in the prior art methods, the magnet is pointing towards the magnetic recording medium. The random orientation means of the present invention is capable of providing lines of magnetic field with only one magnet which reverse themselves in the y-direction, when the magnetic recording medium travels past the magnet. The forward and reverse y-directional magnetic field are of substantially the same magnitude.

Figure 4A:
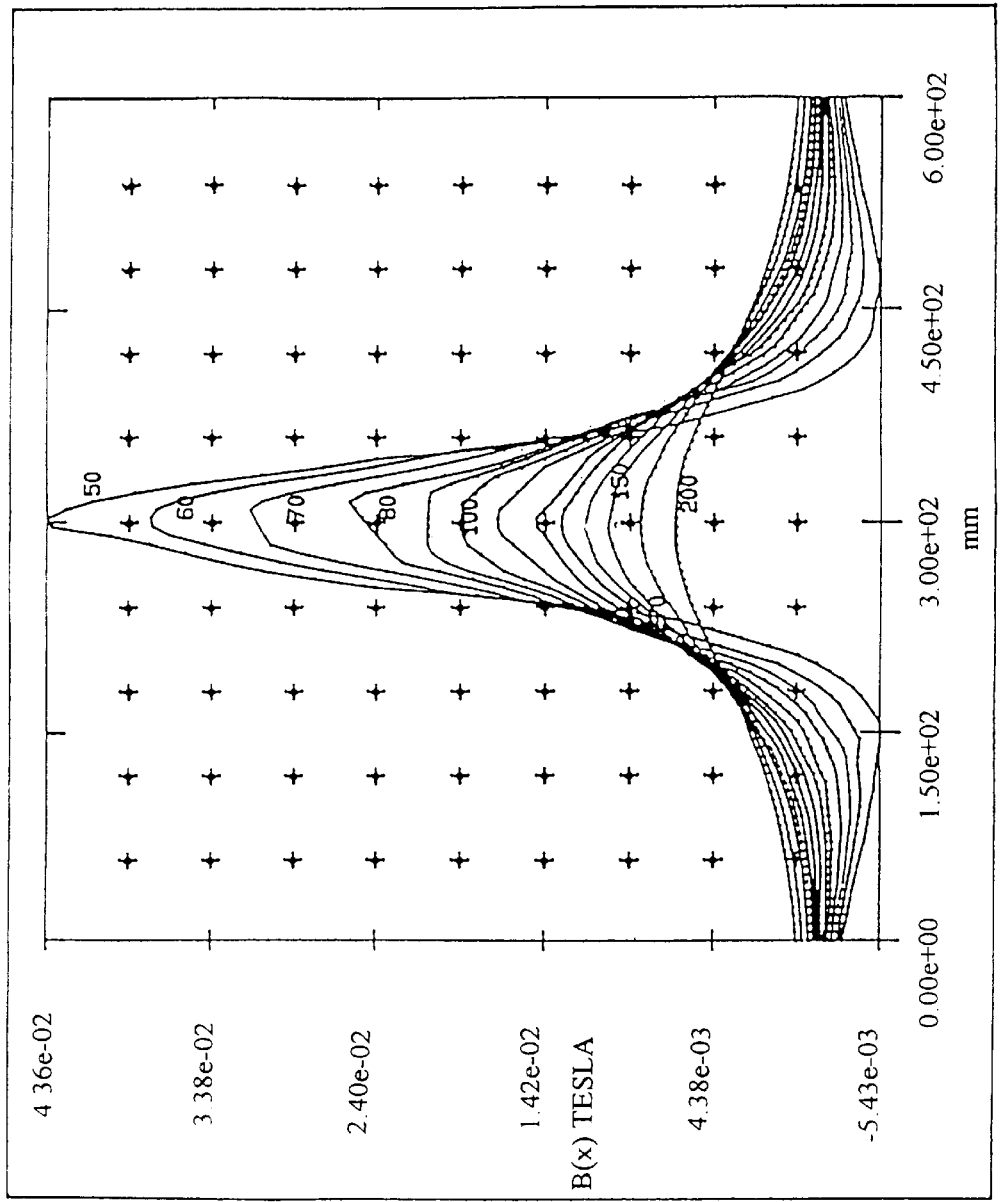
FIG. 4a is a plot of the x-directional magnetic field of the random orientation means in accordance with the first embodiment of the present invention at various distances from the unfinished magnetic recording medium.
Figure 4B:
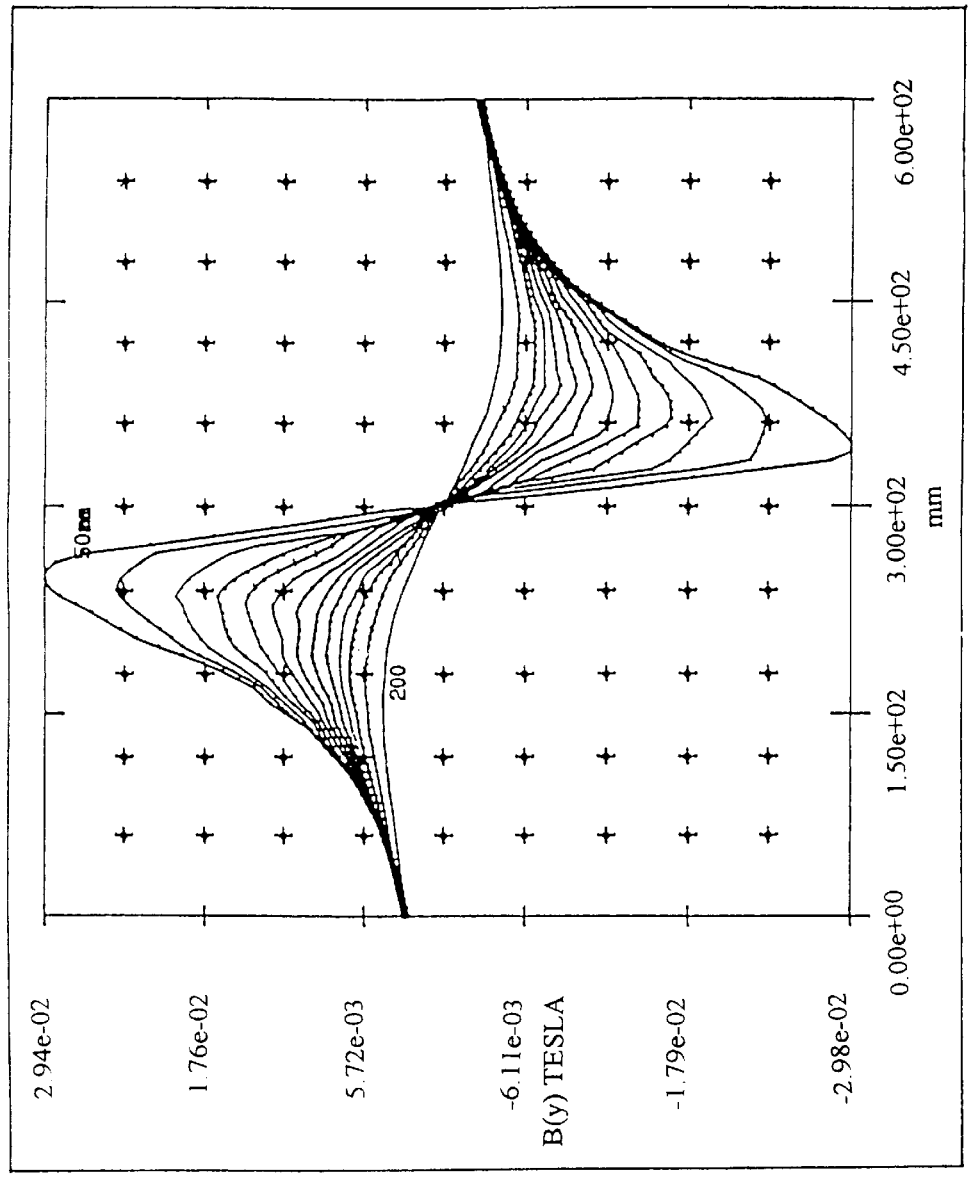
FIG. 4b is a plot of the y-directional magnetic field of the random orientation means in accordance with the first embodiment of the present invention at various distances from the unfinished magnetic recording medium; a complete reversal of the y-directional magnetic field can be observed.

FIG. 4a is a plot of the x-directional magnetic field of the random orientation means 30 in accordance with the first embodiment of the present invention at distances of 50 mm to 200 mm from the magnetic recording medium. FIG. 4b is a plot of the y-directional magnetic field of the random orientation means in accordance with the first embodiment of the present invention at distances of 50 mm to 200 mm from the magnetic recording medium. From FIGS. 3 and 4b, it can be observed that a complete reversal of the y-direction magnetic field is provided by the random orientation means 30. More importantly, the forward and reverse y-directional components of the magnetic field are of the same magnitude. Since the y-direction is perpendicular to the x-direction (i.e., the travelling direction of the unfinished magnetic recording medium), the random orientation means 30 of the present invention provides an effective means of causing random orientations of the ferromagnetic fine particles contained in the unfinished magnetic recording layer which are likely to have been preferentially oriented in the x-direction caused by the shearing associated with coating step.

Figure 5:
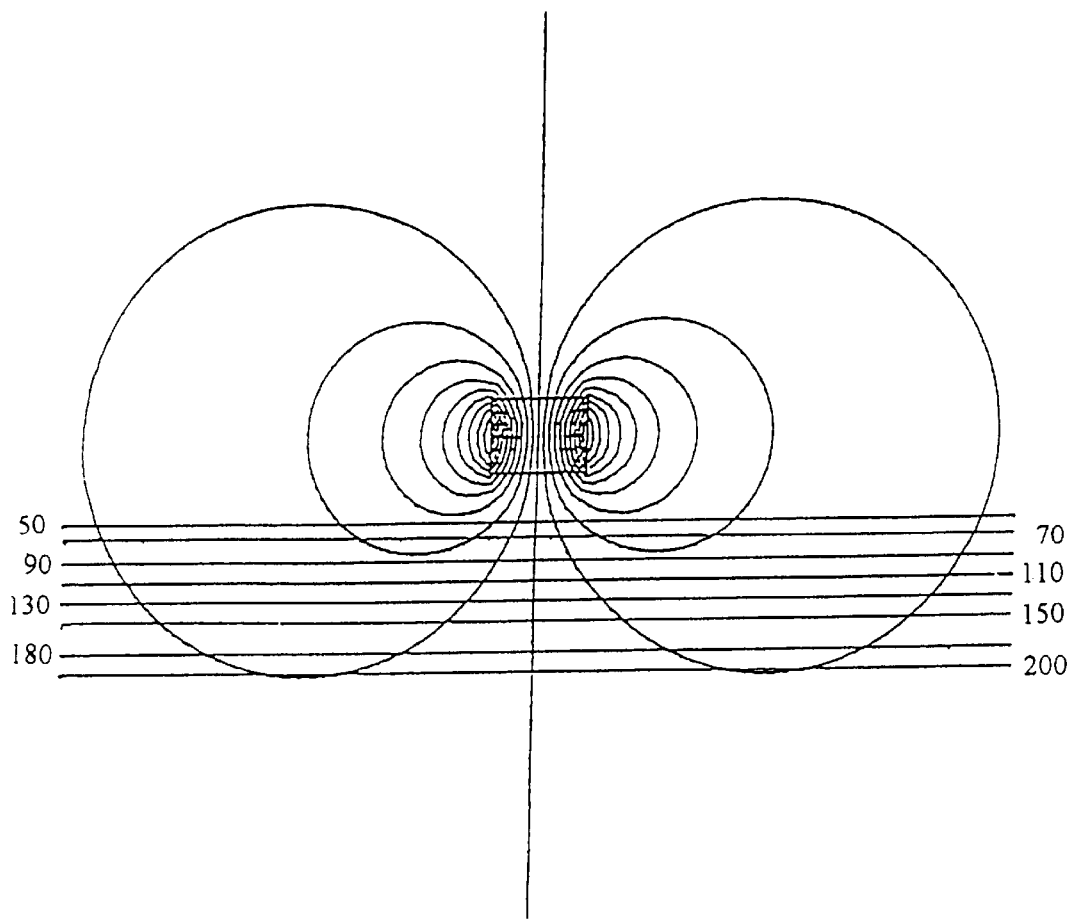
FIG. 5 illustrates the lines of magnetic field in accordance with prior art random orientation method in various spatial relationship with the travelling direction of the unfinished magnetic recording medium.
Figure 6A:
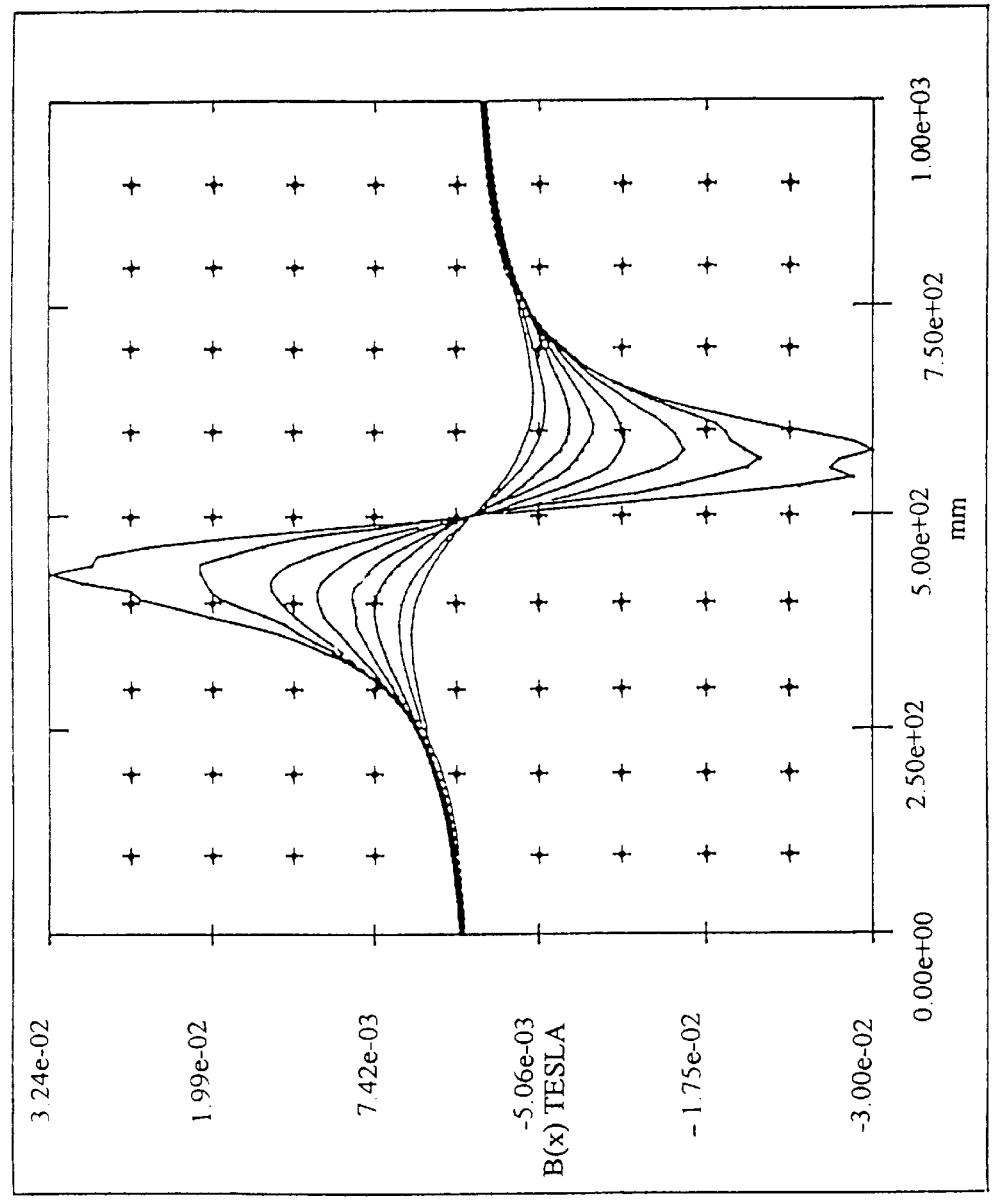
FIG. 6a is a plot of the x-directional magnetic field in accordance with prior art random orientation method at various distances from the unfinished magnetic recording medium.
Figure 6B:
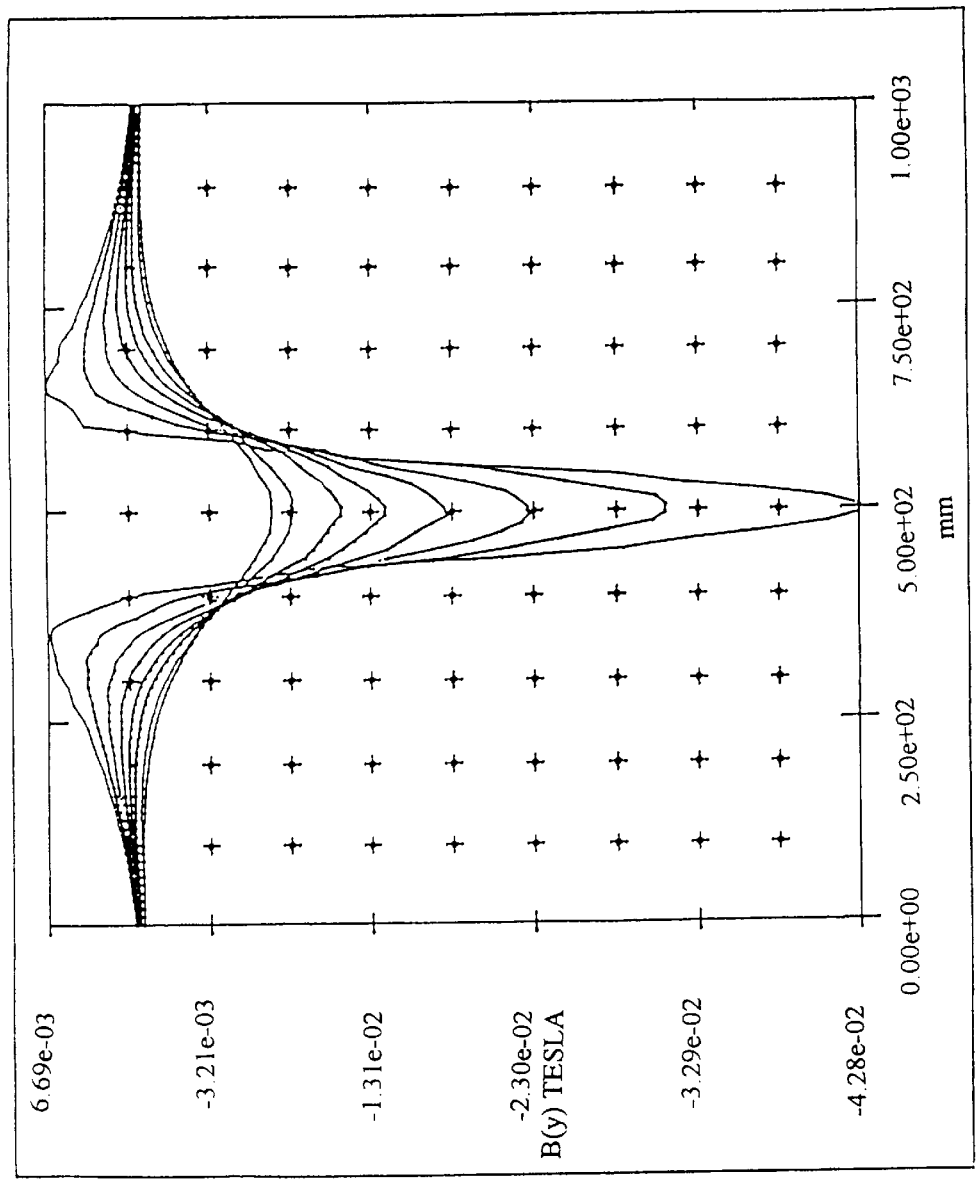
FIG. 6b is a plot of the y-directional magnetic field in accordance with prior art prior art random orientation method at various distances from the unfinished magnetic recording medium; no reversal of the y-directional magnetic field can be observed.

FIG. 5 illustrates the lines of magnetic field of a similar random orientation means disclosed in the prior art methods. FIG. 6a shows a magnetic field reversal in the x-direction. Since the x-direction is the coating direction, such a reversal in the x-direction is not effective in effectuating complete random orientation of the ferromagnetic fine particles. FIG. 6b shows that the majority of the y-directional magnetic field is in the same direction (negative y-direction). Although FIG. 6b shows that there the y-directional magnetic field shows a small portion having positive y-directional magnetic force, it is too weak to be of any significance. As a consequence, the prior art methods always require two or more magnets to form the required lines of magnetic field which contain both forward and reverse y-directional magnetic field.

Figure 7:
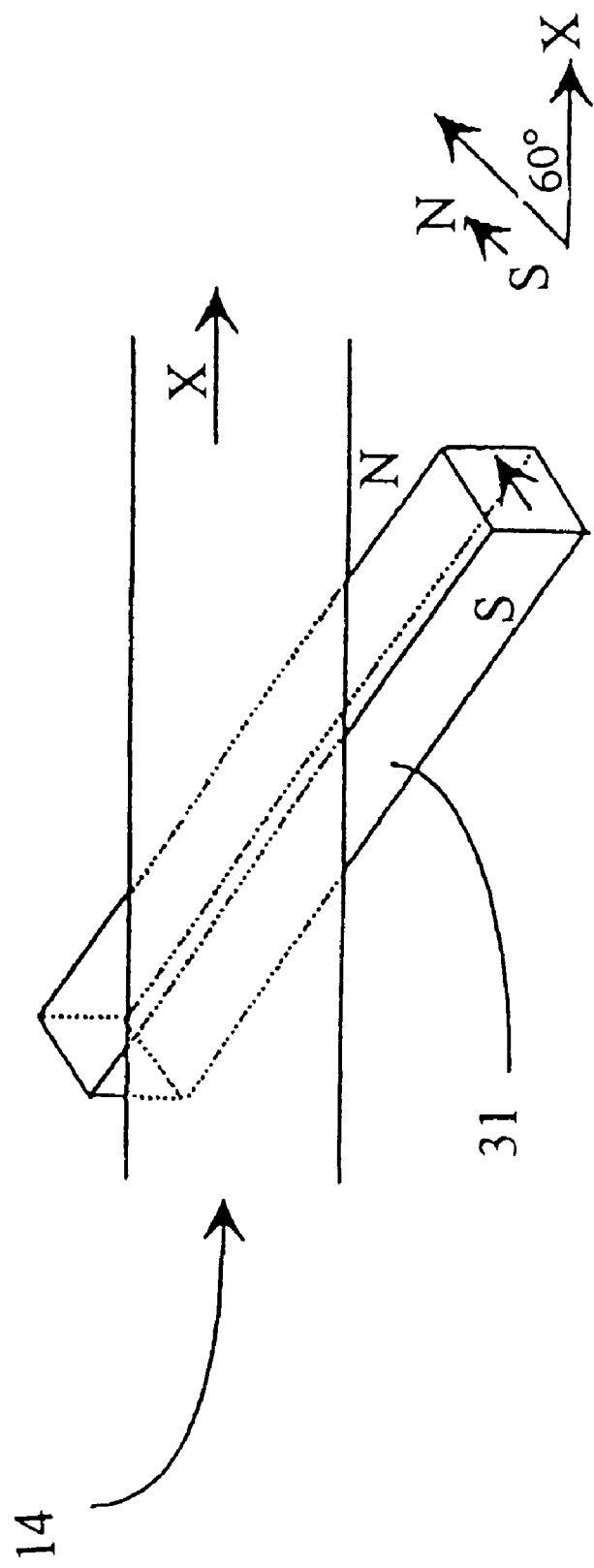
FIG. 7 is a perspective view showing the second preferred embodiment of the present invention in which the magnet is at 120 degrees from the travelling direction of the unfinished magnetic recording medium.

In FIG. 1, the magnet 31 is parallel to the travelling direction of the unfinished magnetic recording medium. If desired, the magnet 31 can be rotated horizontally to provide the same random orientation means 30. In FIG. 7, the magnet 31 is placed below the unfinished magnet recording medium but is at 60 degrees from the travelling direction (x). Since the y-directional magnetic field is relatively unaffected, the random orientation means 30 in FIG. 7 provides the same function as that provided in FIG. 1. Although the orientation of the magnet, i.e., S→N, is at 60 degrees from the x-direction, it still provides lines of magnetic field in which the y-directional magnetic field reverses itself, and the positive and negative y-directional magnetic fields are of substantially the same magnitude. The effect of rotating the magnet in the horizontal direction is to increase the effective length of the treatment zone covered by the random orientation means 30.

Figure 8:
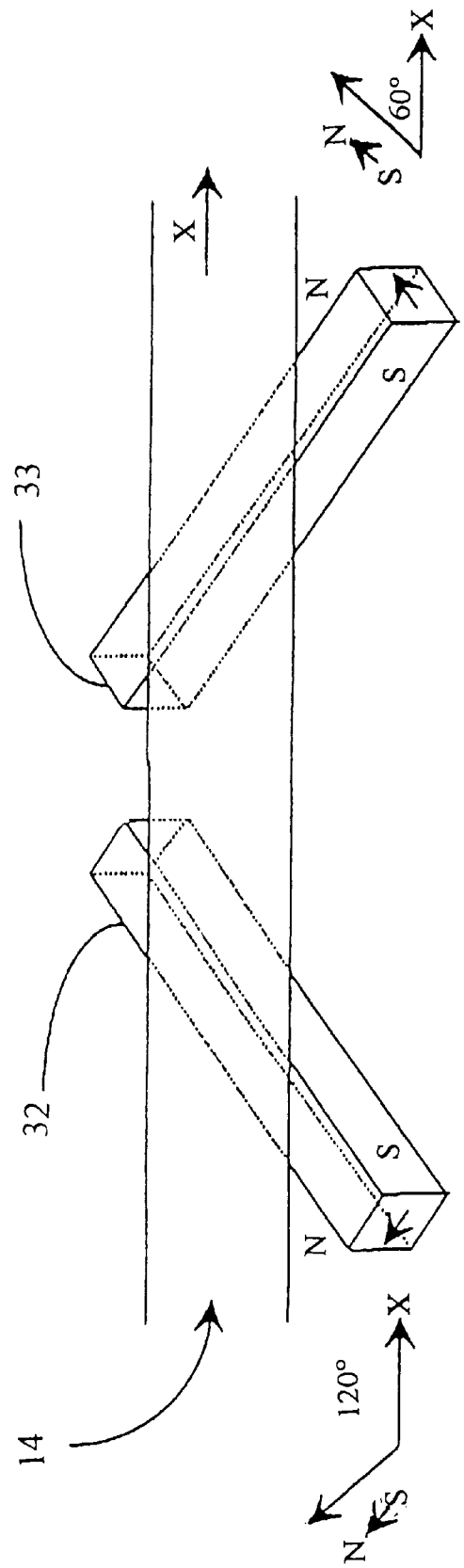
FIG. 8 is a perspective view showing the third preferred embodiment of the present invention which contains two magnets at 60 and 120 degrees, respectively, from the travelling direction of the unfinished magnetic recording medium.
Figure 9:
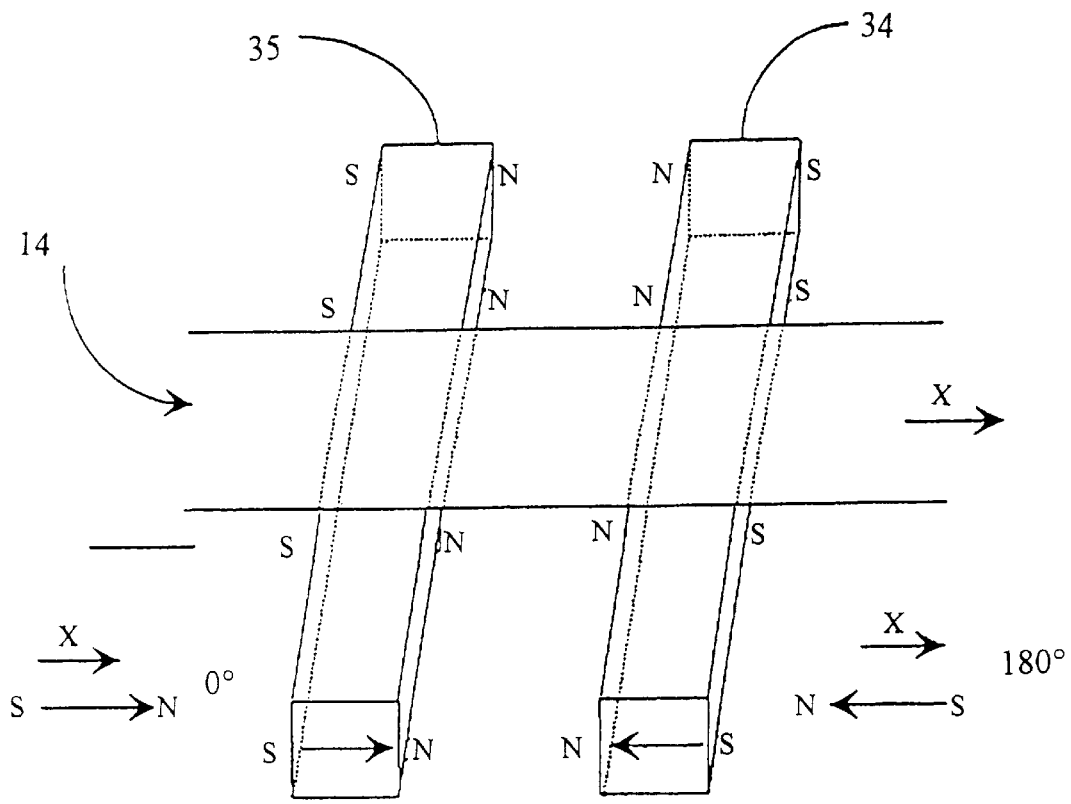
FIG. 9 is a perspective view showing the fourth preferred embodiment of the present invention which contains two magnets, both of them are parallel to the travelling direction of the unfinished magnetic recording medium.

Although the present invention requires only one magnet to provide the desired random orientation means, two or more magnets can be used, each functions as a separate single-magnet random orientation means, to allow for design flexibility. FIG. 8 is a perspective view showing the third preferred embodiment of the present invention which contains two magnets at 60 and 120 degrees, respectively from the travelling direction of the unfinished magnetic recording medium. The two magnets are at 60 degrees from each other. FIG. 9 is a perspective view showing the fourth preferred embodiment of the present invention which contains two magnets, both of them are parallel to the travelling direction of the unfinished magnetic recording medium. In FIGS. 8 and 9, the N-pole of the magnets, 32 and 33 in FIG. 8 and 34 and 35 in FIG. 9, are facing each other. As a result, there are two (or more if more than two magnets are used) separate sets of non-commingling lines of magnetic fields, each set is associated with only one magnet. In other words, each magnet provides a separate and independent random orientation means.

The present invention will now be described more specifically with reference to the following examples. It is to be noted that the following descriptions of example including preferred embodiment of this invention are presented herein for purpose of illustration and description; it is not intended to be exhaustive or to limit the invention to the precise form disclosed.

EXAMPLE 1

A magnetic coating composition was prepared according the following formulation:

| Component | Amount |
| --- | --- |
| Co-γ-Fe$_2$O$_3$ (H$_c$ = 650 O$_c$): | 100 g |
| pu 5715: | 27 g |
| VAGF: | 22 g |
| L-38: | 2.8 g |
| Stearic acid: | 0.5 g |
| Carbon: | 6.7 g |
| Cr$_2$O$_3$: | 4.4 g |
| Lauric acid: | 1.5 g |
| Toluene: | 110 g |
| Cyclohexanol: | 46 g |
| MEK: | 62 g |

The magnetic coating composition 11 was placed in the container 12, as shown in FIG. 1. The coating composition 12 was applied onto the non-magnetic strip support 20 at a rate of 20 m/min. The random orientation means comprises a magnet as shown in FIG. 3 having a dimension of 450 mm×100 mm×75 mm and a magnetic energy of 3.8 MGO$_e$. The magnetic recording medium made from Example 1 was tested by measuring its magnetic strength at various angles, and results are shown in Table 1. Excellent results were achieved, the ratio between the squareness ratio in the vertical direction (SQ$_⊥$) and the square ratio in the horizontal direction (SQ$_∥$) was calculated to be 0.979.

EXAMPLE 2

In Example 2, the magnetic coating composition and the procedure were identically to those in Example 1, except that the magnet was rotated at an angle of 60 degrees from the travelling direction (x) of the unfinished magnetic recording medium, as shown in FIG. 7. The magnetic recording medium made from Example 2 was tested by measuring the magnetic field at various angles, and results are shown in Table 1. Excellent results were also achieved, as evidenced by the excellent ratio (0.998) between the squareness ratio in the vertical direction (SQ$_⊥$) and the square ratio in the horizontal direction (SQ$_∥$).

EXAMPLE 3

In Example 3, the magnetic coating composition and the procedure were identically to those in Example 1, except that two magnets were used which are rotated at 60 degrees and 120 degrees, respectively, from the travelling direction (x) of the unfinished magnetic recording medium, as shown in FIG. 8. The magnetic recording medium made from Example 3 was tested by measuring the magnetic field at various angles, and results are shown in Table 1. Excellent results were achieved, as evidenced by the excellent ratio (0.9998) between the squareness ratio in the vertical direction (SQ$_⊥$) and the square ratio in the horizontal direction (SQ$_∥$).

EXAMPLE 4

In Example 3, the magnetic coating composition and the procedure were identically to those in Example 3, except that both of the two magnets are parallel to the travelling direction (x) of the unfinished magnetic recording medium, as shown in FIG. 9. The magnetic recording medium made from Example 3 was tested by measuring the magnetic field at various angles, and results are shown in Table 1. Excellent results were achieved, as evidenced by the excellent ratio (0.989) between the squareness ratio in the vertical direction (SQ$_⊥$) and the square ratio in the horizontal direction (SQ$_∥$).

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

| Measurement (Angle) | Example 1 | Example 2 | Example 3 | Example 4 |
| --- | --- | --- | --- | --- |
| H$_c$ (0°) | 605 | 604.4 | 603.3 | 606.1 |
| H$_c$ (45°) | 604.5 | 606 | 602 | 603.2 |
| H$_c$ (90°) | 602 | 603.5 | 601.6 | 602.5 |
| H$_c$ (135°) | 602.8 | 605.2 | 602.8 | 602.1 |
| SQ (0°) | 0.6337 | 0.6278 | 0.6296 | 0.6345 |
| SQ (45°) | 0.6248 | 0.6346 | 0.6316 | 0.6293 |
| SQ (90°) | 0.6203 | 0.6267 | 0.6295 | 0.6277 |
| SQ (135°) | 0.62 | 0.6296 | 0.6312 | 0.6284 |
| ΔSQ (=SQ$_{max}$ −SQ$_{min}$) | 0.0137 | 0.0079 | 0.0021 | 0.0068 |
| (SQ$_⊥$)/(SQ$_∥$) | 0.979 | 0.998 | 0.9998 | 0.9893 |

What is claimed is:

1. A method to manufacture magnetic recording media comprising the steps of:
   (a) obtaining a non-magnetic support strip;
   (b) applying a magnetic coating composition on said non-magnetic support strip to form an unfinished magnetic recording medium, said magnetic coating composition containing ferromagnetic fine particles; and
   (c) traveling said unfinished magnetic recording medium through a random orientation means;
   (d) wherein said random orientation means comprising a set of magnetic lines associated with a single magnet, which is an elongated magnet bar having two opposing long faces as north and south pole faces, respectively, and is oriented such that its principal axis, pointing from said south pole face to said north pole face, is not perpendicular to said magnetic recording medium; and
   (e) said set of magnetic lines containing first and second magnetic field components, both of which are perpendicular to the plane of said magnetic recording medium;
   (f) further wherein said first and second magnetic field components are substantially equal in magnitude but opposite in direction, such that when said ferromagnetic fine particles travel past said first magnetic field component, they are forced to orient in one direction, and are forced to orient in a reversed direction when they travel past said second magnetic field component, so as to cause random orientation of said ferromagnetic fine particles by said single magnet.

2. The method to manufacture magnetic recording media according to claim 1, wherein said magnet being disposed parallel to said non-magnetic support strip.

3. The method to manufacture magnetic recording media according to claim 1, wherein said magnet being disposed at an angle between 0 to 60 degrees relative to said first direction.

4. The method to manufacture magnetic recording media according to claim 1, wherein said magnet being disposed at 60 degrees relative to said first direction.

5. The method to manufacture magnetic recording media according to claim 4, wherein said two magnets being disposed at 60 degrees and 120 degrees, respectively, with respect to said first direction.

6. The method to manufacture magnetic recording media according to claim 4, wherein both of said two magnets being disposed parallel to said first direction.

7. The method to manufacture magnetic recording media according to claim 4, wherein said two magnets being disposed at 0 to 60 degrees and 120 to 180 degrees, respectively, with respect to said first direction.

8. The method to manufacture magnetic recording media according to claim 1, wherein random orientation means comprising two sets of lines of a magnetic field and two magnets, each set of lines of magnetic field being respectively associated with a separate magnet.

9. A method to manufacture magnetic recording media comprising the steps of:
   (a) obtaining a non-magnetic support strip;
   (b) applying a magnetic coating composition containing ferromagnetic fine particles on said non-magnetic support strip to form an unfinished magnetic recording medium; and
   (c) traveling said unfinished magnetic recording medium in a first direction through a random orientation means;
   (d) wherein said random orientation means comprising a magnet in a spaced relationship with said non-magnetic support strip, said magnet generating a set of magnetic lines associated with only said magnet, which is an elongated magnet having two opposing long faces as north and south pole faces, respectively; said magnet being oriented such that:
      (i) its principal axis, pointing from said south pole face to said north pole face, is not perpendicular to said magnetic recording medium;
      (ii) said set of magnetic lines containing first and second magnetic field components, both of which being perpendicular to the plane of said magnetic recording medium; and
      (iii) said first and second magnetic field components are substantially equal in magnitude but are opposite in direction, so as to cause said ferromagnetic fine particles to be randomly oriented by said single magnet.

10. The method to manufacture magnetic recording media according to claim 9, wherein said magnet being disposed parallel to said non-magnetic support strip.

11. The method to manufacture magnetic recording media according to claim 9, wherein said magnet being disposed at an angle between 0 to 60 degrees relative to said first direction.

12. The method to manufacture magnetic recording media according to claim 9, wherein said magnet being disposed at 60 degrees relative to said first direction.

13. The method to manufacture magnetic recording media according to claim 9, wherein random orientation means comprising two magnets, each magnet generating a separate and independent set of lines of magnetic field being associated with a separate magnet.

14. The method to manufacture magnetic recording media according to claim 13, wherein both of said two magnets being disposed parallel to said first direction.

15. The method to manufacture magnetic recording media according to claim 13, wherein said two magnets being disposed at 0 to 60 degrees and 120 to 180 degrees, respectively, with respect to said first direction.

16. The method to manufacture magnetic recording media according to claim 13, wherein said two magnets being disposed at 60 degrees and 120 degrees, respectively, with respect to said first direction.

* * * * *